UNITED STATES PATENT OFFICE.

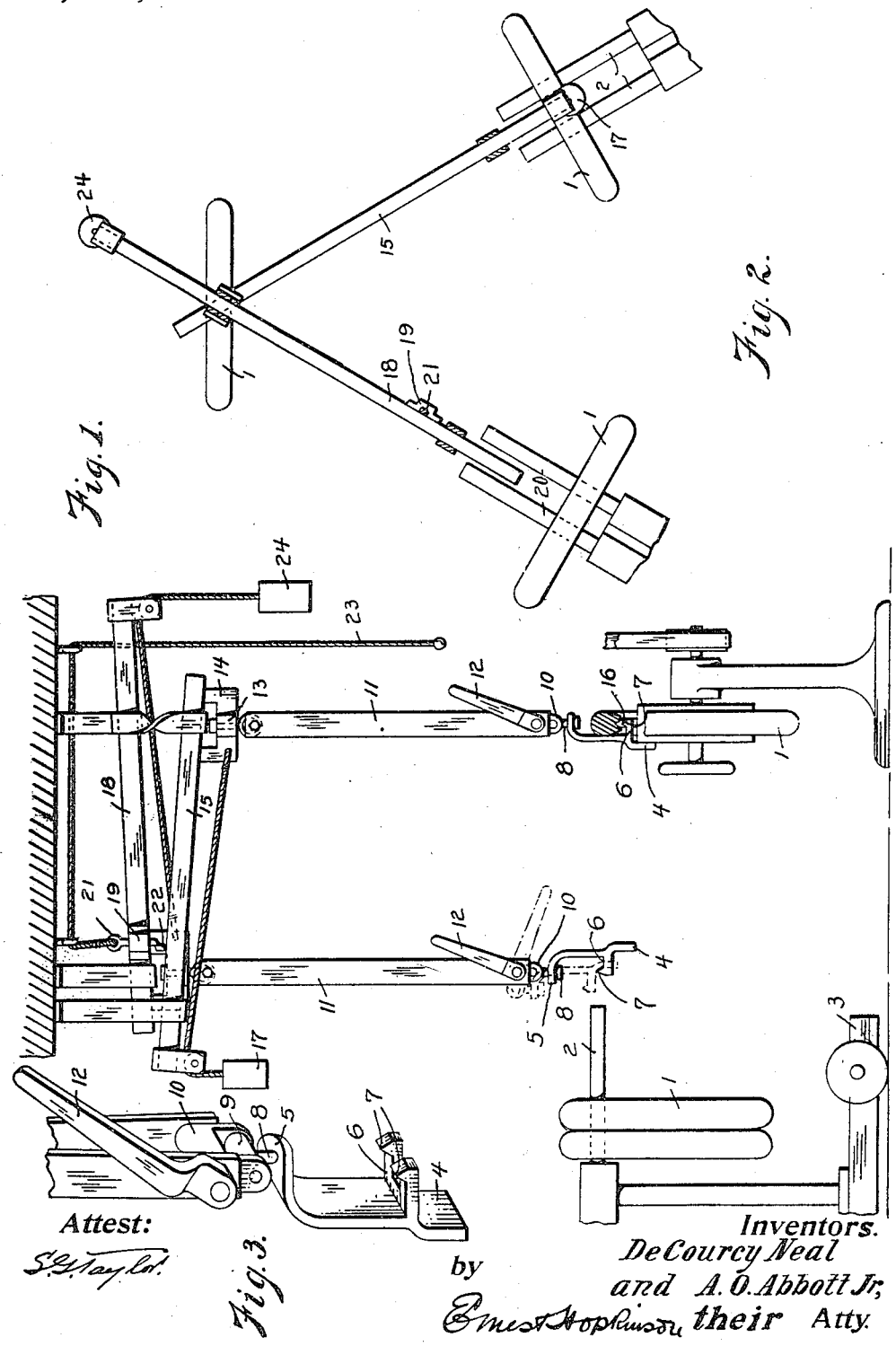
DE COURCY NEAL & A. O. ABBOTT, Jr.
CORE HANDLING APPARATUS FOR TIRE BUILDING MACHINES.
APPLICATION FILED JUNE 15, 1917.
1,289,233.  Patented Dec. 31, 1918.
Attest:
S. G. Taylor
Inventors.
De Courcy Neal
and A. O. Abbott Jr.
Ernest Hopkinson their Atty.

DE COURCY NEAL AND ADRIAN O. ABBOTT, JR., OF DETROIT, MICHIGAN, ASSIGNORS TO MORGAN & WRIGHT, A CORPORATION OF MICHIGAN.

CORE-HANDLING APPARATUS FOR TIRE-BUILDING MACHINES.

1,289,233.  Specification of Letters Patent.  Patented Dec. 31, 1918.

Application filed June 15, 1917. Serial No. 174,850.

*To all whom it may concern:*

Be it known that we, DE COURCY NEAL and ADRIAN O. ABBOTT, Jr., both citizens of the United States, residing at Detroit, county of Wayne, State of Michigan, have invented certain new and useful Improvements in Core-Handling Apparatus for Tire-Building Machines, of which the following is a full, clear, and exact description.

This invention relates to apparatus for positioning and removing tire cores from tire building machines. It is more particularly directed to an apparatus for successively moving a series of tire cores from a frame or other support onto a core support of a tire building machine and placing the cores successively on a second support after operation of the tire building machine thereon. One of the objects of the invention is to provide a simple apparatus of the kind described which shall in large part do away with hand-labor. Another object of the invention is to devise a rapid and efficient apparatus of the kind mentioned which may be carried out with extremely simple and inexpensive apparatus.

Briefly stated, the invention consists in apparatus for conveying a tire core along a track-way into engagement with the core support of a tire building machine securing the tire core on the core support and subsequently removing the core.

An apparatus embodying the invention is shown in the accompanying drawings wherein:

Figure 1 represents an elevation of a device, partially shown in section;

Fig. 2 represents a plan view of the device, partially in section; and

Fig. 3 represents a detail view of the operation of the conveyer.

Referring now more particularly to the drawings, the numeral 1 indicates one of the series of tire cores supported as here shown, by the parallel bars 2 of a frame mounted on a truck 3. A conveyer consisting of a plate provided with an off-set lower portion 4, an overhanging curved portion 5 and projecting U-shaped engaging member 6, the ends of whose arms are provided with knife blades 7, is suspended adjacent the core 1. The upper portion 5 is mounted on a swivel 8 which is secured on a shaft 9 secured pivotally at its ends to a yoke-shaped member 10, which is pivotally mounted at the extremities of parallel arms 11. The member 10 is adapted to be rotated by a lever 12 attached to a stud projecting therefrom. The upper ends of the arms 11 are pivotally secured to a swivel member 13 mounted upon a carriage 14 adapted to travel along a suitably supported inclined track 15, one of whose ends lies approximately over the series of tire cores, and the other of whose ends is approximately over a spider or core support 16 of the tire building machine. The track 15, as shown, is for delivery of the cores to the tire building machine and is inclined from the portion above the tire cores downwardly to the position above the core support. The travel of the conveyer and core is thus effected by gravity and when core is positioned on the tire building machine, the carriage 14 is returned by a counterweight 17 passing over a pulley and attached by a rope thereto.

Suitably supported adjacent the track-way 15 is a second track-way 18 provided with a conveyer substantially identical with the conveyer associated with the track-way 15. This conveyer is mounted upon a carriage 19. The track 18 is situated with one end over the spider 16 and the other end over a frame 20 adapted to receive the ring cores upon which tires have been built. When the carriage 19 has deposited a core with a tire thereon upon the frame 20, it is preferably held in such position by a spring-held latch 21 co-acting with a keeper 22 mounted on a suitably supported plate. The latch is adapted to be operated by a rope 23 having its end dangling in a convenient position for grasping by the operator. When the latch releases the carriage, a counterweight 24 connected by a rope passing over a pulley to the carriage, serves to move it up the inclined track-way 18 to a position for grasping the next completed core.

In operating the device, the knife blade teeth of the conveyer 6 are raised by the handle 12 to fit the correspondingly angular recess of the core 1, and the conveyer having been turned around upon its swivel, is allowed to pass by gravity down the inclined track 15 into engagement with the spider 16 of the tire building machine. This engagement is permitted by the U-shaped construction of the plate 6 whereby the arm of the spider may pass between the arms of this U-shaped member and engage the recess of the core while the latter is still in engagement with the teeth of the conveyer. The spider is then moved in the usual manner to secure the core thereon and the handle 12 being turned, releases the engagement of the conveyer. The tire building operation having been carried on, the carriage 19 is brought to a position adjacent the core with the tire thereon and while the spider is still in engagement, the conveyer associated with the carriage 19 is brought into engagement with the recess of the core. The spider is then released, the handle 12 is raised, and the conveyer with core attached is permitted to run by gravity to a position adjacent the support 20. The core is then placed upon this support and the conveyer released therefrom.

As many apparently widely different embodiments of this invention may be made without departing from the spirit thereof, it is to be understood that we do not intend to limit ourselves to the specific form of the invention as set forth, except as indicated in the appended claims.

Having thus described our invention, what we claim and desire to protect by Letters Patent is:

1. In an apparatus of the kind described, two racks each adapted to hold a plurality of tire cores, two reversely inclined overhead track-ways, core-engaging members, one carried by and movable longitudinally of each track-way, and means for raising and lowering said core-engaging members, whereby a core may be raised and transported by gravity from one rack to a tire building machine and from said machine to the second rack.

2. In an apparatus of the kind described, two racks each adapted to hold a plurality of tire cores, two reversely-inclined overhead track-ways, a supporting arm movable along each track-way, a core-engaging member carried by each arm, whereby a core may be carried by gravity toward or from a tire building machine, and a weight connected with each arm for returning it to initial position after the disengagement of a core therefrom.

3. In an apparatus of the kind described, a rack adapted to support a plurality of tire cores in vertical position, an inclined overhead track-way adapted for position intermediate said rack and a tire building machine, an arm movable along the trackway, a core-engaging member carried by said arm, a lever for raising and lowering said core engaging member with a core held thereby, whereby said core may be transported by gravity from the rack to the tire building machine.

4. In an apparatus of the kind described a rack comprising spaced horizontal arms adapted to support a plurality of tire cores in vertical position, an inclined overhead track-way adapted for position intermediate said rack and a tire building machine, a core-engaging member supported from said track-way and adapted for movement between the arms of the rack, and means for raising and lowering said core-engaging member with a core held thereby, whereby said core may be transported by gravity from the rack to the tire building machine.

Signed at Detroit, Michigan, this 11th day of June, 1917.

DE COURCY NEAL.
ADRIAN O. ABBOTT, Jr.